(12) United States Patent
Bryne

(10) Patent No.: US 7,174,807 B2
(45) Date of Patent: Feb. 13, 2007

(54) PEDAL/CLEAT ASSEMBLY

(75) Inventor: Richard M. Bryne, Del Mar, CA (US)

(73) Assignee: Speedplay, Inc., San Diego, CA (US)

( * ) Notice: Subject to any disclaimer, the term of this patent is extended or adjusted under 35 U.S.C. 154(b) by 0 days.

(21) Appl. No.: 11/111,671

(22) Filed: Apr. 20, 2005

(65) Prior Publication Data

US 2006/0236809 A1  Oct. 26, 2006

(51) Int. Cl.
*G05G 1/14* (2006.01)
(52) U.S. Cl. .................... 74/594.6; 74/594.4; 36/131
(58) Field of Classification Search ............... 74/594.4, 74/594.6; 36/131
See application file for complete search history.

(56) References Cited

U.S. PATENT DOCUMENTS

| | | | |
|---|---|---|---|
| 4,942,778 A | 7/1990 | Bryne | |
| 5,079,968 A | 1/1992 | Starner | |
| 5,213,009 A | 5/1993 | Bryne | |
| 5,325,738 A | 7/1994 | Bryne | |
| 5,363,573 A | 11/1994 | Kilgore et al. | |
| 5,546,829 A | 8/1996 | Bryne | |
| 5,606,894 A | 3/1997 | Bryne | |
| 5,687,619 A | 11/1997 | Bryne | |
| 5,765,450 A | 6/1998 | Kruger et al. | |
| 5,852,955 A | 12/1998 | Crisick et al. | |
| 5,862,716 A | 1/1999 | Bryne | |
| 6,014,914 A * | 1/2000 | Ueda | .................... 74/594.6 |
| 6,151,989 A | 11/2000 | Ueda | |
| 6,205,885 B1 | 3/2001 | Hermansen et al. | |
| 6,425,304 B1 | 7/2002 | Bryne | |
| 6,494,117 B1 | 12/2002 | Bryne | |
| 7,017,445 B2 * | 3/2006 | Bryne | ...................... 74/594.6 |
| 2003/0051576 A1 | 3/2003 | Muraoka | |
| 2004/0187635 A1 | 9/2004 | Bryne | |
| 2005/0155452 A1 * | 7/2005 | Frey | ......................... 74/594.6 |
| 2005/0252337 A1 * | 11/2005 | Chen | ......................... 74/594.6 |
| 2005/0284253 A1 * | 12/2005 | Hervig | ...................... 74/594.6 |

FOREIGN PATENT DOCUMENTS

| | | |
|---|---|---|
| EP | 0 619 219 A1 | 10/1994 |
| EP | 0 826 587 A1 | 3/1998 |

\* cited by examiner

*Primary Examiner*—Vinh T. Luong
(74) *Attorney, Agent, or Firm*—Sheppard, Mullin, Richter & Hampton LLP

(57) ABSTRACT

An improved pedal/cleat assembly provides a float range that is easily and precisely adjusted. The pedal/cleat assembly includes a pedal assembly incorporating a forward cleat retainer and a spring-biased rearward cleat retainer, and it further includes a cleat assembly that defines forward and rearward projections sized and configured to engage and be retained by the respective forward and rearward cleat retainers. The cleat assembly includes a first cleat body that defines the forward and rearward projections, and it further includes a second cleat body configured to be attached to the underside of a rider's shoe and to be secured to the first cleat body in a manner that allows limited rotation relative to the first cleat body about a cleat rotation axis. The first cleat body is free to rotate by an angular amount that is controlled by a pair of set screws. This provides a pedal float that is easily and precisely adjustable.

13 Claims, 10 Drawing Sheets

PEDAL/CLEAT ASSEMBLY

BACKGROUND OF THE INVENTION

This invention relates generally to pedals for use on bicycles and the like, and, more particularly, to clipless pedal/cleat assemblies in which a cleat attached to a rider's shoes can be releasably secured to a pedal.

Clipless pedals of this particular kind commonly include forward and rearward cleat retainers mounted on the pedal's upper side. These cleat retainers are configured to be forcibly retractable apart from each other, against the yielding bias of a spring mechanism, to receive and releasably secure forward and rearward projections that are part of a cleat attached to the sole of a rider's shoe. The rider can release the cleat and shoe from the pedal simply by rotating the shoe by a predetermined angular amount, about an axis perpendicular to the pedal's upper side. This causes cam surfaces on the cleat to engage the forward and rearward cleat retainers and forcibly urge the cleat retainers apart from each other, against the yielding bias of the spring mechanism, to release the retainers' retention of the cleat.

Many pedal/cleat assemblies of this kind provide a "float range," which is an amount of angular rotation that the rider's shoe can have without disengaging the cleat from the pedal. This reduces restrictions on the natural rotation of the rider's leg during pedaling, and thus reduces the possibility of injury. Prior pedal systems of this kind typically have provided float ranges as high as ±7.5°.

In the past, the float ranges of pedal/cleat assemblies typically have been fixed, but in some cases could be adjusted. In general, however, provisions for adjusting the float range have not been entirely satisfactory. In some cases, the adjustments could be made only in large increments, while in other cases, the adjustments have been difficult to perform.

It should, therefore, be appreciated that there is a continuing need for an improved pedal/cleat assembly in which the assembly provides a float range that is easily and precisely adjustable. The present invention fulfills this need and provides further related advantages.

SUMMARY OF THE INVENTION

The present invention is embodied in an improved pedal/cleat assembly that provides a float range that is easily and precisely adjustable. The pedal/cleat assembly includes a cleat assembly configured for attachment to the underside of a rider's shoe, and a pedal assembly configured to releasably secure the cleat assembly. The cleat assembly includes (1) a first body that defines forward and rearward projections arranged in a prescribed, fixed relationship to each other, (2) a second body configured to be attached to the underside of the rider's shoe and to be secured to the first body, for limited rotation relative to the first body about a cleat rotation axis, and (3) a stop mechanism carried by the first and second bodies, for limiting rotation of the second body relative to the first body. The pedal assembly includes (1) a rotatable spindle, (2) a main pedal body mounted for rotation on the spindle and having an upper side configured for engagement with the cleat assembly, and (3) forward and rearward cleat retainers projecting upwardly from the upper side of the main pedal body, on opposite sides of the spindle. The forward and rearward cleat retainers are sized and configured to be forcibly retractable apart from each other, so as to receive and retain the respective forward and rearward projections of the cleat assembly, to secure the cleat assembly to the pedal assembly. In addition, rotation of the second body of the cleat assembly, about the cleat rotation axis and beyond the limit provided by the stop mechanism, forcibly retracts the forward and rearward cleat retainers apart from each other, to release the cleat assembly from the pedal assembly.

More particularly, the stop mechanism of the cleat assembly includes a pair of first stop surfaces defined on the first cleat body, and a pair of second stop surfaces defined on the second cleat body. The second cleat body is freely rotatable relative to the first cleat body, about the cleat rotation axis, until one of the second stop surfaces engages one of the first stop surfaces, whereupon further relative rotation is prevented. In one embodiment, the pair of second stop surfaces is defined by a finger projecting radially outward from the second cleat body, and the pair of first stop surfaces is defined by two set screws adjustably mounted on the first cleat body. Adjustment of the set screws modifies the amount of free clockwise and counterclockwise rotation of the second cleat body relative to the first cleat body.

In one preferred configuration, the first cleat body is unitary and has a circular opening centered on the cleat rotation axis, and the second cleat body includes a generally disc-shaped portion located within the circular opening of the first cleat body. In an alternative preferred configuration, the first cleat body carries a pair of rivets or screws that engage the second cleat body and that are confined to move in arcuate slots concentric with the cleat rotation axis. In both cases, the second cleat body is free to rotate through a limited angle relative to the first cleat body.

In more detailed features of the invention, the pedal assembly further includes a spring for biasing the forward and rearward cleat retainers toward each other. Insertion of the cleat assembly into the pedal assembly forcibly retracts the forward and rearward cleat retainers apart from each other, against the yielding bias of the spring, so as to receive and retain the respective forward and rearward projections of the cleat assembly and thereby secure the rider's shoe to the pedal assembly. The spring preferably comprises a coil section encircling the spindle and an engagement section movable circumferentially relative to the spindle. A spring tension adjuster is attached to the main pedal body and configured to controllably move the spring's engagement section circumferentially relative to the spindle, to adjust the spring's resistance to movement of the forward and rearward cleat retainers apart from each other.

In other more detailed features of the invention, the main pedal body includes an inner ring and an outer ring disposed around the spindle, and it further includes a U-shaped member constituting the forward cleat retainer. The pedal assembly further includes a pivoting latch mechanism mounted on the spindle, between the inner and outer rings of the main pedal body, the pivoting latch mechanism supporting the rearward cleat retainer in a position spaced from the forward cleat retainer, and a spring operatively connected between the main pedal body and the pivoting latch mechanism, for biasing the rearward cleat retainer toward the forward cleat retainer. The spring preferably includes first and second coil sections encircling the spindle, on opposite sides of the pivoting latch mechanism, and it further includes a U-shaped spring section interconnecting the first and second coil sections. A spring tension adjuster engages the main pedal body and is configured to controllably move the spring's U-shaped spring section circumferentially relative to the main pedal body, to adjust the spring's resistance to movement of the forward and rearward cleat retainers apart from each other.

Other features and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENTS

Figure 1:
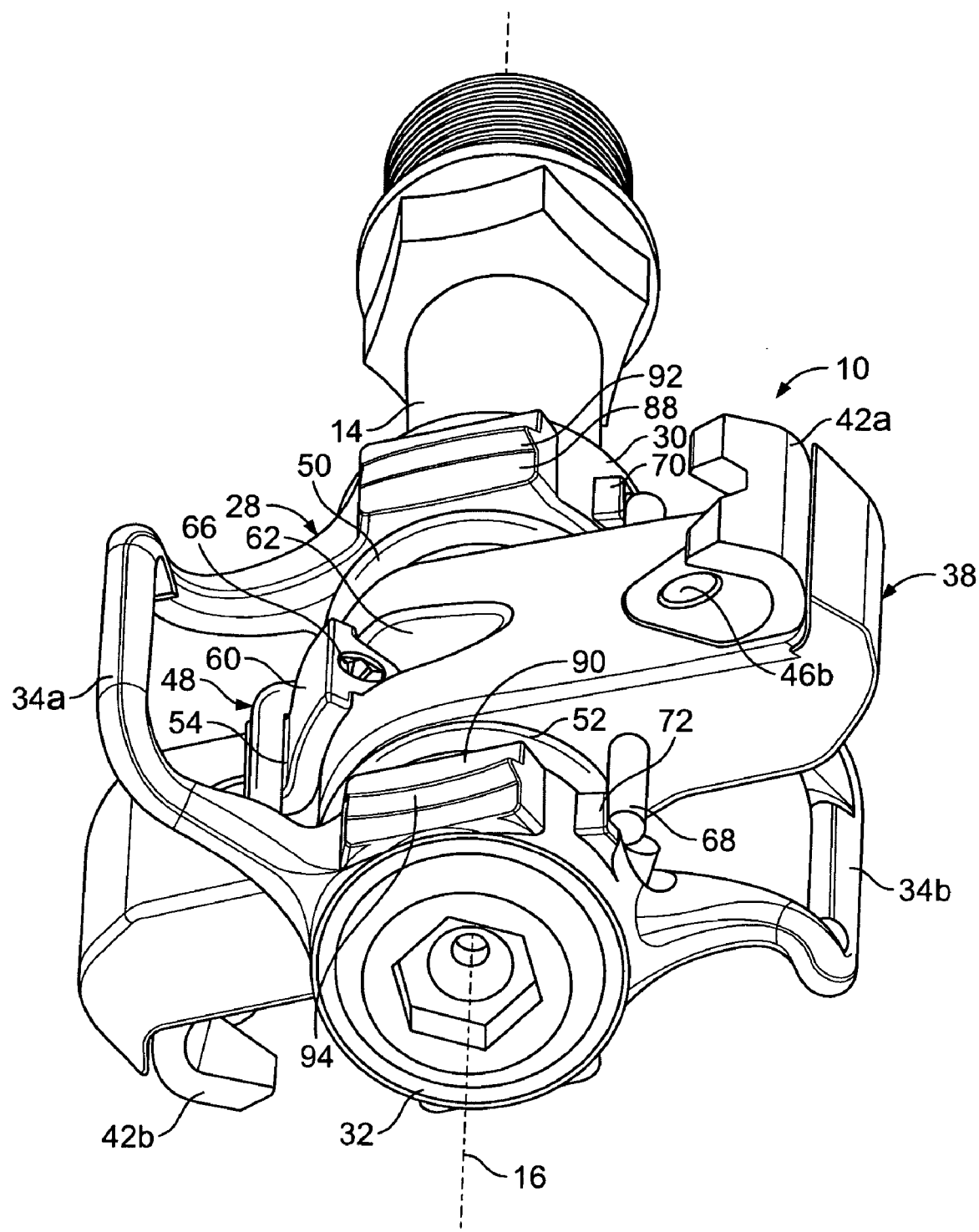
FIG. 1 is a top, left-side perspective view of a first embodiment of a pedal assembly embodying the invention.

With reference now to the illustrative drawings, and particularly to FIGS. 1–4 and 6, there is shown a first embodiment of a bicycle pedal/cleat assembly in accordance with the invention, including a pedal assembly 10 and an associated cleat assembly 12. The cleat assembly is secured to the underside of the sole of a rider's shoe (not shown), and it is configured to be attachable to the pedal assembly in a manner that allows limited rotational movement, but to be released from that attachment if the rotational movement exceeds a selected angular amount. Only a left-side pedal assembly is shown in the drawings and discussed below, although it will be understood that a similar, mirror-image pedal assembly can be located on the bicycle's right side.

More particularly, the pedal assembly 10 includes an elongated spindle 14 that projects laterally from a bicycle crank (not shown). The spindle is rotatable about a spindle axis 16 oriented to be parallel with the crank's rotation axis. A bearing sleeve 18 is mounted at the remote end of the spindle, for rotation relative to the spindle. This mounting is accomplished using a joumal bearing 20 at the bearing sleeve's inner end and a spacer 22 at the bearing sleeve's outer end. A nut 24 is threaded to the spindle's outer end, and an end cap 26 snaps over the nut, to secure the components in place. An O-ring 27 is located on the spindle 14, to seal the inner end of the journal bearing.

A main pedal body 28 includes inner and outer rings 30 and 32 that are mounted on the bearing sleeve 18, and the pedal body further includes a pair of U-shaped forward cleat retainers 34a and 34b that span from one ring to the other. The two U-shaped forward cleat retainers are located on diametrically opposed sides of the main pedal body, and they are sized and configured to receive and retain a forward projection 36 that is part of the cleat assembly 12 (see FIGS. 2 and 4). The main pedal body preferably is formed of hardened steel or a similar hard metal.

The pedal assembly 10 further includes a two-part pivoting latch mechanism 38 encircling the bearing sleeve 18, in the space between the inner and outer rings 30 and 32 of the main pedal body 28. This pivoting latch mechanism includes two elongated halves 40a and 40b, which conformably mate with each other and define a cylindrical recess at its mid-region, sized to snuggly receive the sleeve. When the two latch mechanism halves are mated around the sleeve, the latch mechanism projects in opposite directions from the sleeve. The latch mechanism halves preferably are formed of a composite thermoplastic material, or other suitable lightweight, but strong material.

Figure 2:
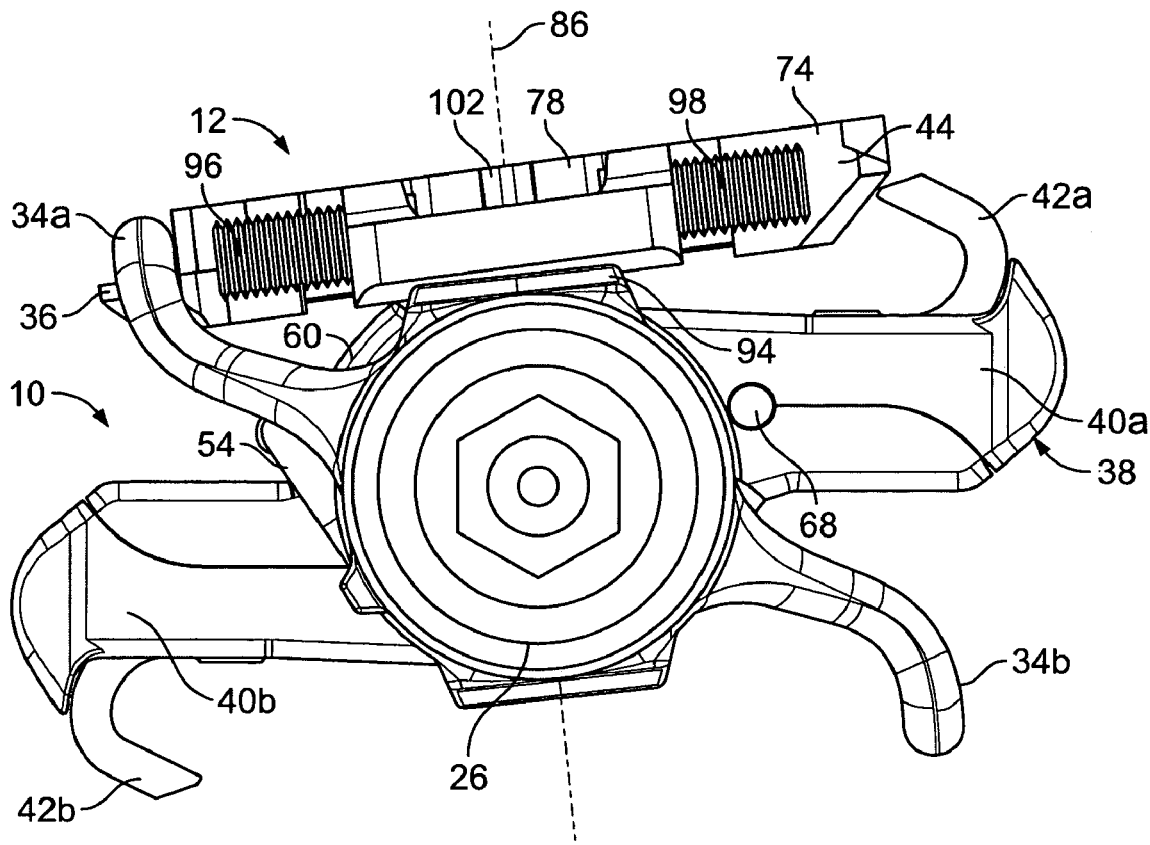
FIG. 2 is a left side elevational view of the pedal assembly of FIG. 1, shown with a cleat assembly being inserted for engagement with the pedal assembly's forward and rearward cleat retainers.
Figure 3:
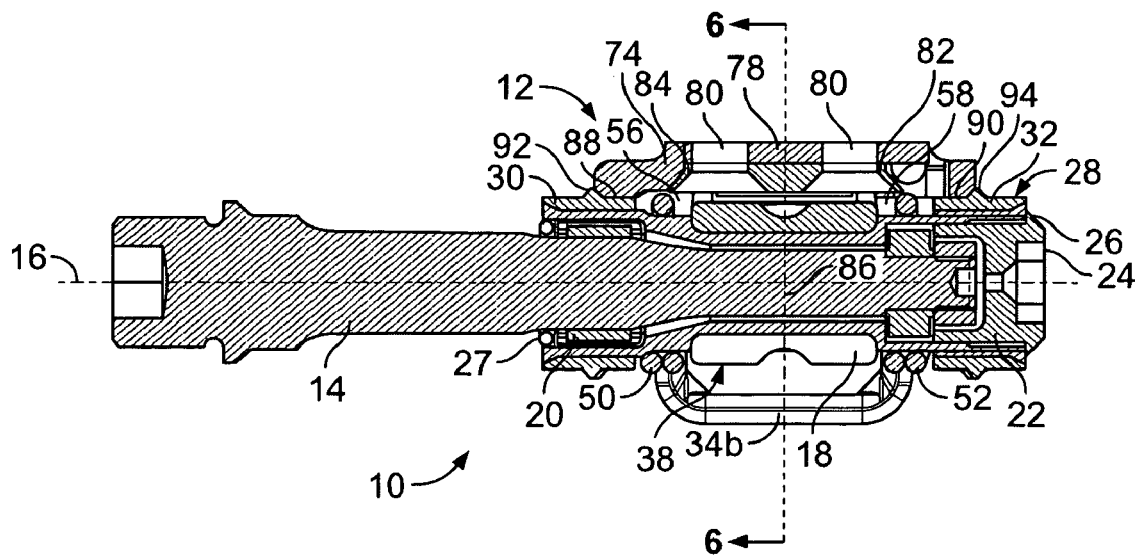
FIG. 3 is a sectional view of the pedal assembly of FIG. 1, taken substantially in the direction of the arrows 3—3 in FIG. 6.
Figure 4:
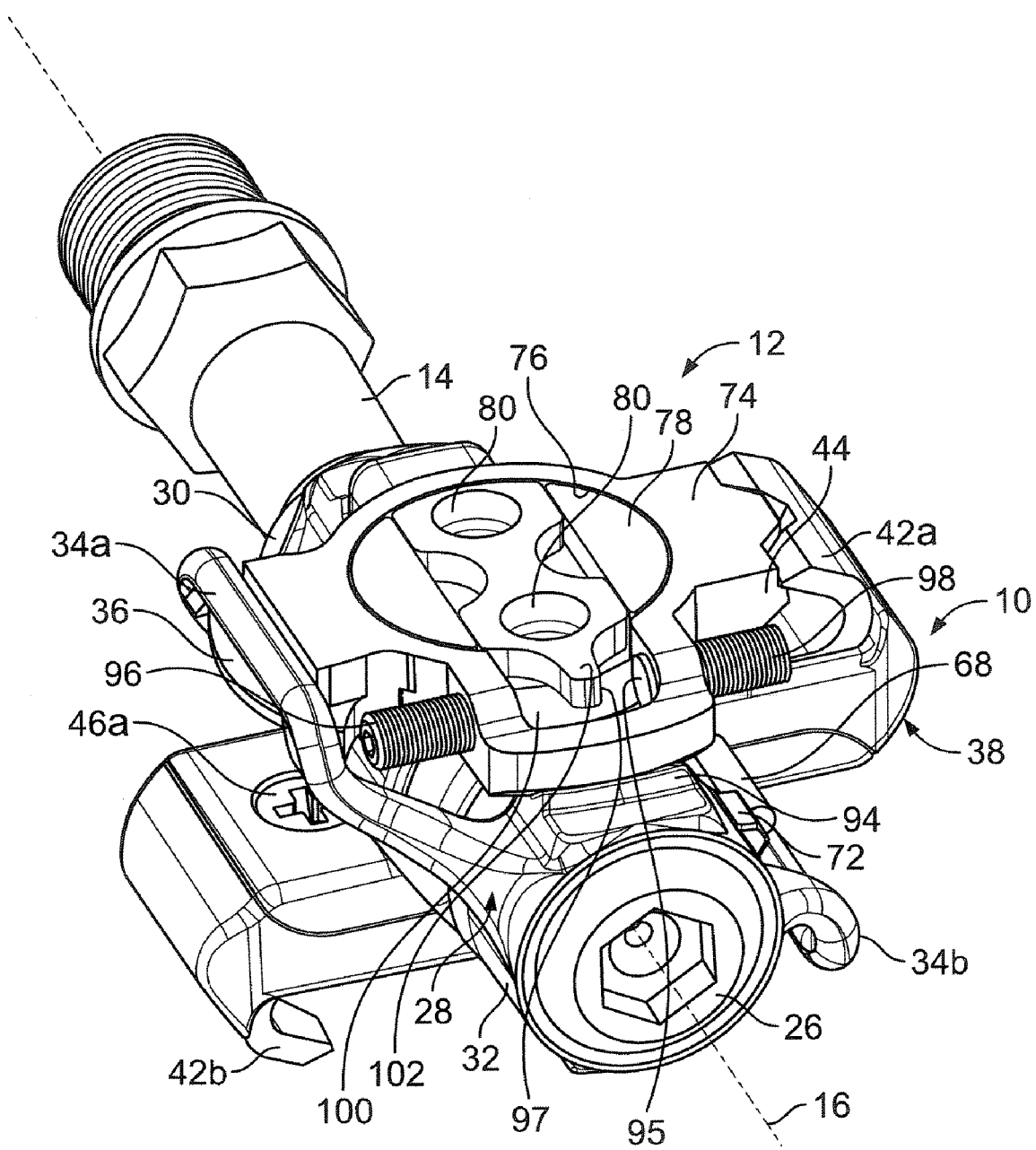
FIG. 4 is a top, left-side perspective view of the pedal assembly of FIG. 1, shown with the cleat assembly being retained by the pedal assembly's forward and rearward cleat retainers and with the cleat assembly positioned at a midpoint of its float, with a pair of set screws being depicted for adjustably controlling the amount of clockwise and counterclockwise float between the cleat assembly and the pedal assembly.

Located at the two ends of the pivoting latch mechanism 38 are rearward cleat retainers 42a and 42b, which are configured to receive and retain a rearward projection 44 of the cleat assembly 12 (see FIGS. 2 and 4). The rearward cleat retainers preferably are formed of hardened steel, or a similar hard metal, and each is received in a complementarily sized and shaped recess formed at one end of the pivoting latch mechanism. The two latch mechanism halves 40a and 40b, and the two rearward cleat retainers 42a and 42b, all are secured in place by a pair of screws 46a and 46b extending through aligned holes formed in those components. The screw threads engage threads in the holes formed in the rearward cleat retainers, and the screw heads are seated in frustoconical recesses formed in one of the latch mechanism halves.

Each cooperating pair of forward and rearward cleat retainers 34a and 42a, or 34b and 42b, define a seat for receiving and releasably retaining the forward and rearward projections 36 and 44 of the cleat assembly 12. As is conventional, whichever of the two cooperating pairs of cleat retainers is most conveniently oriented is the pair that is used to retain the cleat assembly; the other pair of cleat retainers is not used at that time.

The two rearward cleat retainers 42a and 42b are spring-biased to forward positions that provide a minimum spacing with the cooperating forward cleat retainers 34a and 34b. This spring-bias is provided by a spring 48 formed from a single length of spring wire. The spring includes two spring coils 50 and 52 that encircle the bearing sleeve 18, in narrow annular spaces between the pivoting latch mechanism 38 and the two rings 30 and 32 of the main pedal body 28. A U-shaped spring section 54 extends across the pivoting latch mechanism and interconnects with ends of the two spring coils. The other ends of the two spring coils are retained by recesses 56 and 58 formed in the main pedal body. In operation, the U-shaped spring section engages the pivoting latch mechanism, to bias the upper side of the latch mechanism forward, toward the U-shaped forward cleat retainer 34a of the main pedal body.

Controlled adjustability of the amount of spring bias applied by the spring 48 to the pivoting latch mechanism 38 is provided by a tension adjuster 60 positioned between the spring's U-shaped spring section 54 and the pivoting latch mechanism 38. The tension adjuster seats in a channel 62 formed in one of the pivoting latch mechanism's two halves 40a, 40b. A hook 64 at the bottom end of the tension adjuster projects forward, to conformably mate with the underside of the U-shaped spring section. A set screw 66 extends through a threaded bore formed in the tension adjuster and projects out from its lower end to abut against the upper side of the pivoting latch mechanism. Controllably rotating the set screw within the threaded bore effectively moves the tension adjuster upward or downward relative to the pivoting latch mechanism, like a jack, to tighten or loosen the spring tension. The tension adjuster is constrained to move circumferentially along the channel 62, which, in turn, moves the U-shaped spring section 54 along an arc that is concentric with the spindle axis 16. This provides a more uniform adjustment of spring tension.

The pivoting latch mechanism 38 is prevented from being moved excessively forward, which would bring the rearward cleat retainer 42a (or 42b) too close to the forward cleat retainer 34a (or 34b), by a pin 68 that extends through a through-hole formed in the latch mechanism. The pin's two ends project outwardly from the through-hole to engage a stops 70 and 72 formed in the respective inner and outer rings 30 and 32 of the main pedal body 28.

Figure 5:
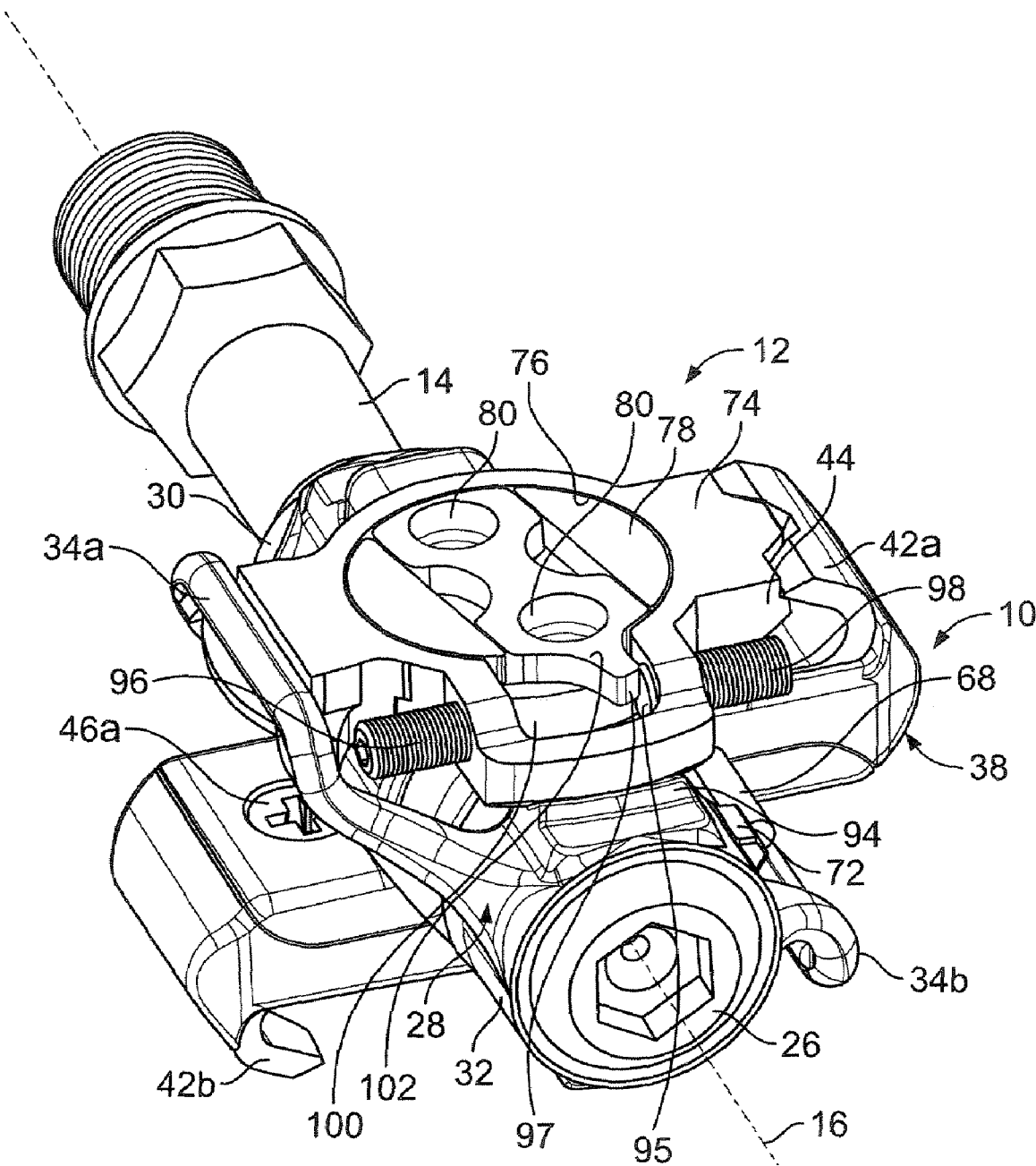
FIG. 5 is a top, left-side perspective view of the pedal assembly of FIG. 1, similar to FIG. 4, but with the cleat assembly rotated to its maximum counterclockwise position.
Figure 6:
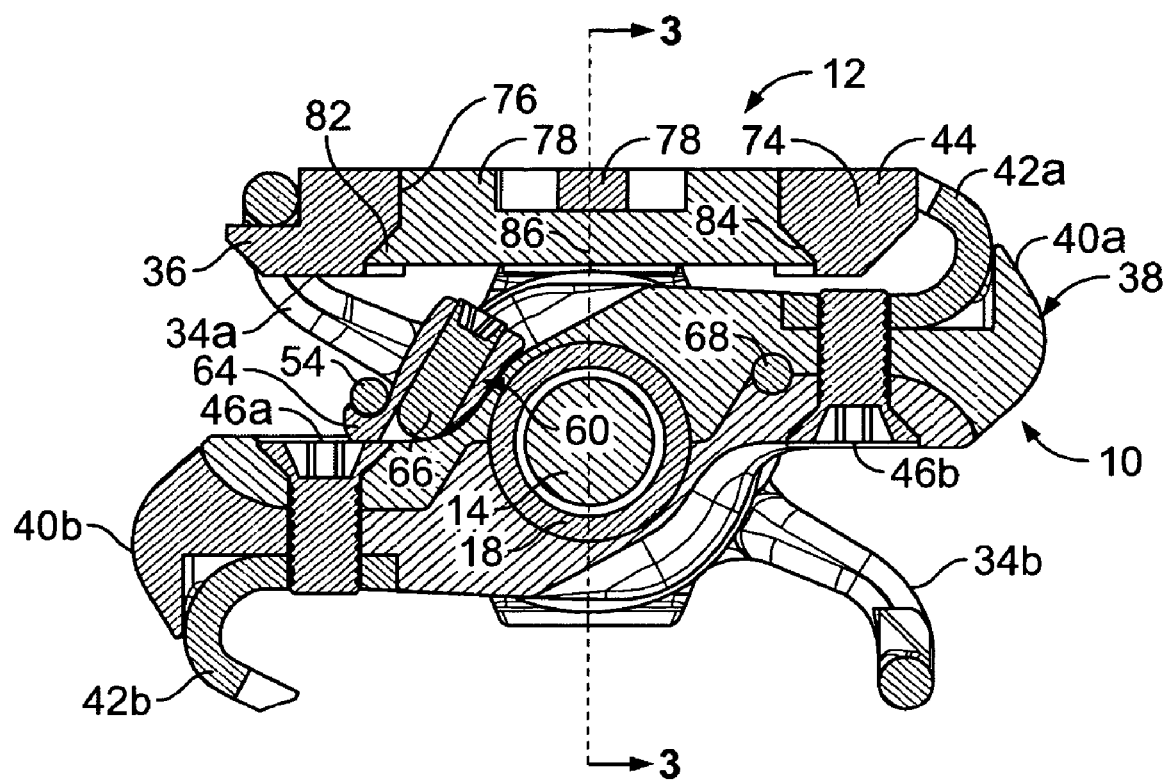
FIG. 6 is a cross-section view of the cleat assembly, taken substantially in the direction of the arrows 6—6 in FIG. 3.

With reference now to FIGS. 2, 4, and 5, the cleat assembly 12 includes a main cleat body 74 that defines the forward projection 36 and the rearward projection 44. These projections are sized and configured to engage and be retained by the respective U-shaped forward cleat retainer 34a (or 34b) and rearward cleat retainer 42a (or 42b) of the pedal assembly 10. The main cleat body further defines a circular opening 76 in its central region, which is sized to receive a rotatable disc-shaped body 78. This disc-shaped body includes a recess that receives an insert 79 having a pair of countersunk recesses 80 for use in securing the disc-shaped body, and thus entire cleat assembly, to the underside of the sole of a rider's shoe (not shown). A frustoconical flange 82 of the disc-shaped body seats in a mating frustoconical recess 84 of the main cleat body, to retain the main cleat body in place when the disc-shaped body is secured to the shoe. In that position, the main cleat body is free to rotate by a limited amount relative to the disc-shaped body, about a cleat rotation axis 86.

The rider engages the cleat assembly 12 with the pedal assembly 10 by inserting the cleat assembly's forward projection 36 into the space beneath whichever of the two U-shaped forward cleat retainers 34a (or 34b) is more conveniently oriented and by then pressing the cleat assembly's rearward projection 44 downward against the pedal assembly's rearward cleat retainer 42a (or 42b). The abutting surfaces of the rearward projection and the rearward cleat retainer are appropriately beveled, such that the downward pressure forces the rearward cleat retainer in a rearward direction, against the yielding bias of the spring 48. Eventually, the rearward cleat retainer will have moved sufficiently rearward to allow the rearward projection to snap into position beneath the rearward cleat retainer, whereupon the spring forcibly returns the rearward cleat to a forward position to lock the cleat assembly in place.

When the cleat assembly 12 is engaged with the pedal assembly 10, the underside of the cleat assembly's main cleat body 74 rests atop lateral support platforms 88 and 90 defined in the respective inner and outer rings 30 and 32 of the main pedal body 28. Arcuate ridges 92 and 94 on these support platforms are configured to resist lateral movement of the cleat assembly when it is in its engaged position.

In one feature of the invention, the amount of pedal float is controllably adjustable using forward and rearward set screws 96 and 98, which are carried within threaded bores formed in the main cleat body 74. These set screws define a pair of first stop surfaces 95 and project into a cutout region 100 of the main cleat body, adjacent to the disc-shaped body 78 and the insert 79. A finger 102 defines a pair of second stop surfaces 97 and projects radially outward from the insert into the cutout region, for engagement with a first stop surface 95 of the forward and rearward set screws. The forward set screw 96 limits clockwise rotation of the insert and disc-shaped body relative to the main cleat body; this corresponds to heel-out rotation of the rider's shoe relative to the pedal assembly 10. The rearward set screw 98, on the other hand, limits counterclockwise rotation of the insert and disc-shaped body relative to the main cleat body; this corresponds to heel-in rotation of the rider's shoe relative to the pedal assembly. The finger 102 is provided on a separate component, in the form of the insert 79, so that its special shape can be manufactured conveniently using a stamping process.

The cutout region 100 is sized to allow a maximum float of up to about 7.5° in either rotational direction. A maximum float is provided by retracting the set screws 96 and 98 fully into their respective threaded bores. On the other hand, a minimum float (i.e., zero float) is provided by extending the set screws fully into the cutout region to abut against both sides of the finger 102. Of course, any amount of float between zero and the maximum can be selected simply by adjustably positioning the set screws.

In its locked position, the cleat assembly 12 is free to rotate clockwise or counterclockwise relative to the pedal assembly 10 by whatever float has been selectively provided using the set screws 96 and 98. Throughout this limited angular movement, the cleat assembly remains locked to the pedal assembly. If the cleat assembly is rotated by more than the selected float, either clockwise (heel out) or counterclockwise (heel in), the cleat assembly's forward projection 36 and rearward projection 44 will forcibly urge the respective forward and rearward cleat retainers 34a and 42a apart from each other, against the yielding bias of the spring 48. Eventually, the two cleat retainers will be moved apart sufficiently to release their retention of the two projections. This releases the cleat assembly from the pedal assembly.

Figure 7:
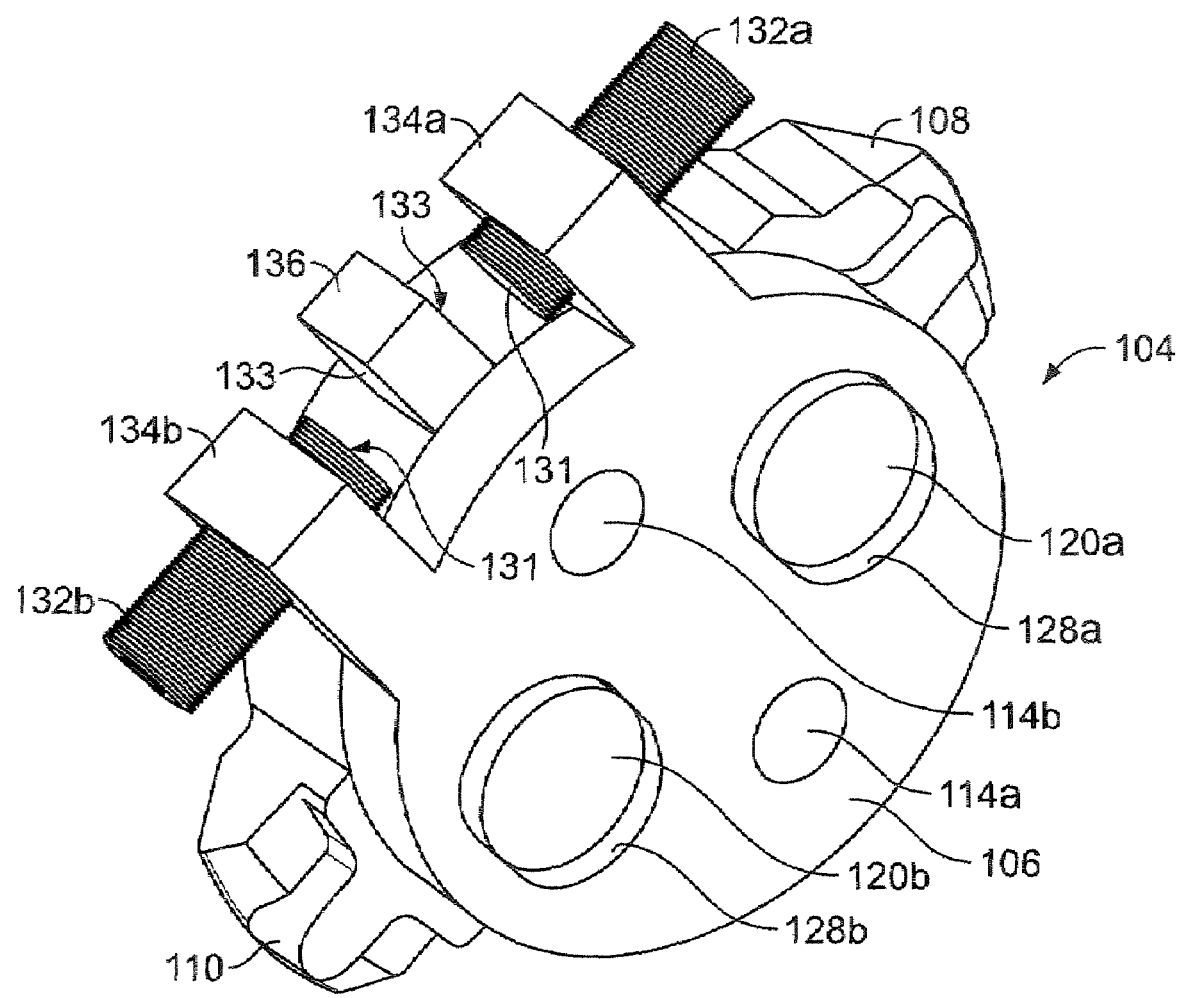
FIG. 7 is a perspective view of the upper side of a second embldiment of a cleat assembly in accordance with the invention.
Figure 8:
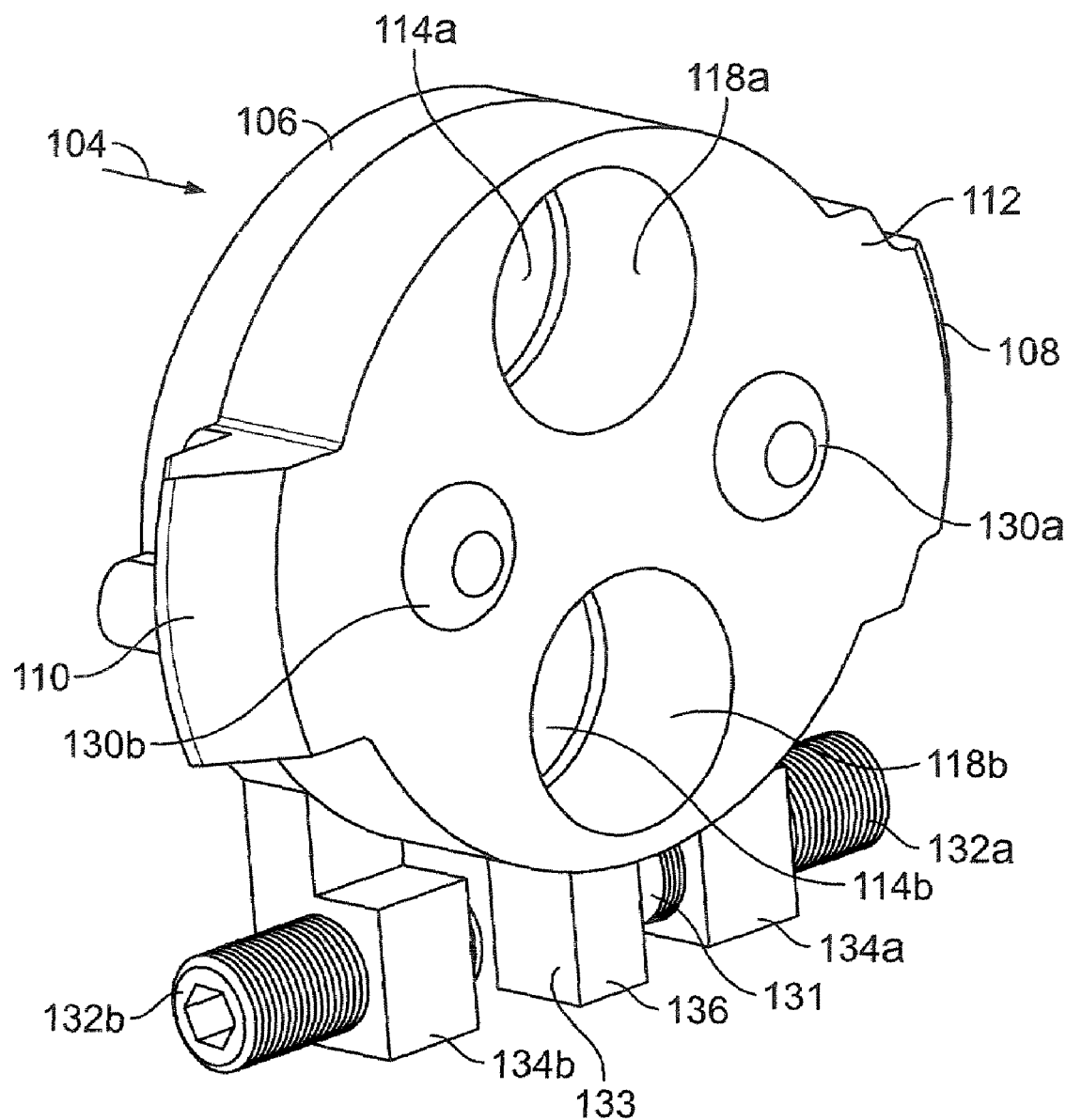
FIG. 8 is a perspective view of the underside of the cleat assembly of FIG. 7.
Figure 9:
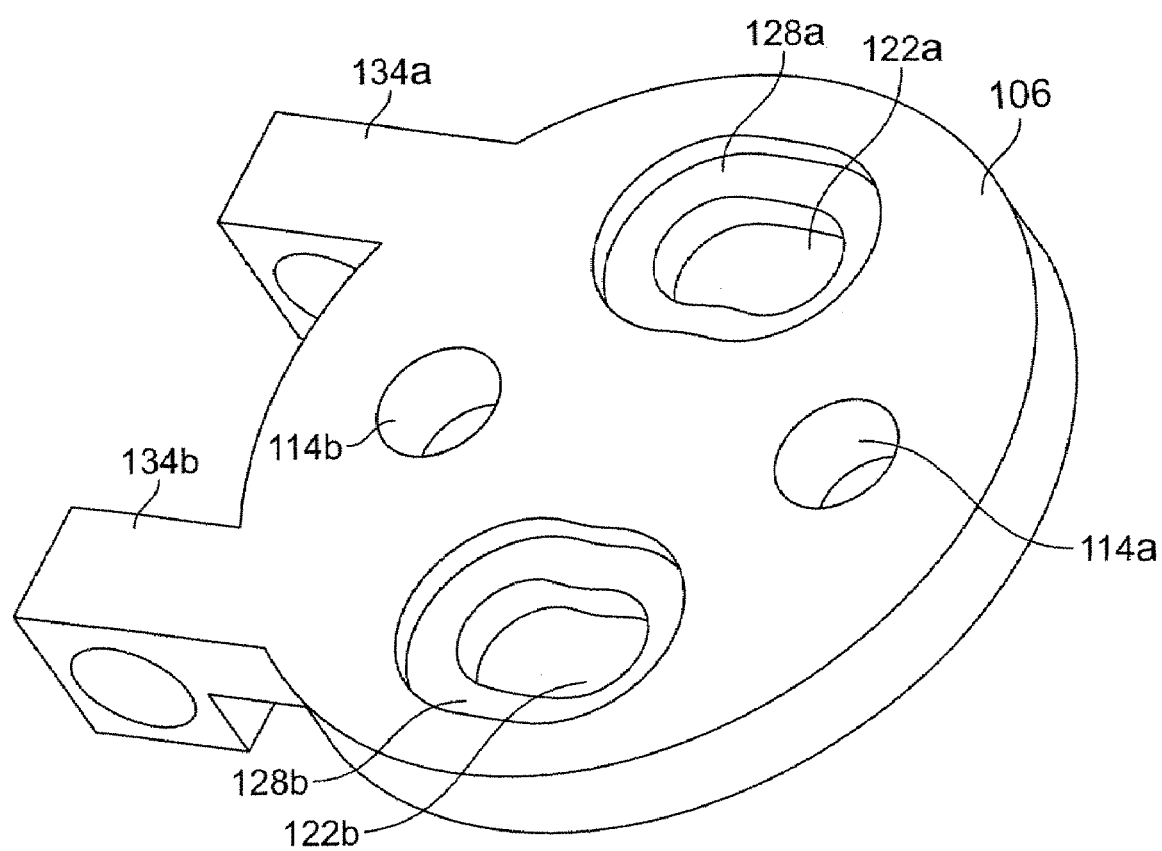
FIG. 9 is a perspective view of the underside of the second disc-shaped cleat body of the cleat assembly of FIG. 7, with the two float-adjusting set screws and the two rivets removed.

FIGS. 7–9 depicts a second embodiment of a cleat assembly 104 in accordance with the invention, suitable for use with the pedal assembly 10 of FIGS. 1–6. The cleat assembly 104 includes a first disc-shaped cleat body 106 having two circular openings 114a, 114b for receiving attachment screws (not shown) that can be used to attach the body to the underside of the sole of a rider's shoe (not shown), for engagement with, and retention by, the respective forward and rearward cleat retainers 34 and 42 of the pedal assembly. The cleat assembly further defines a second disc-shaped cleat body 112 defining a forward projection 108 and a rearward projection 110. The second cleat body 112 is configured to be secured to the first cleat body 106, for limited rotation about a cleat rotation axis. Access to the attachment screws that attach the first cleat body 106 to the rider's shoe is provided by enlarged openings 118a, 118b (FIG. 8) formed in the second cleat body 112.

More particularly, the first disc-shaped cleat body 106 is secured to the second disc-shaped cleat body 112 by two rivets 120a, 120b extending through openings 122a, 122b in the first cleat body and aligned openings (not clearly visible in the drawings) in the second cleat body 112. The heads of the rivets are seated in countersunk recesses 128a, 128b formed in the first cleat body, and the remote ends of the rivet shanks are enlarged, as indicated by the reference numerals 130a, 130b (FIG. 8), to secure the two cleat bodies together. The openings 122a, 122b of the first cleat body 106, including the countersunk recesses 128a, 128b, are elongated into a kidney shape, so as to accommodate limited rotation of the first cleat body relative to the second cleat body. A rotation of about ±10° is accommodated. It will be appreciated that two screws could be substituted for the two rivets.

Thus, when the cleat assembly 104 is assembled, with the first cleat body 106 attached by screws to the sole of a rider's shoe, and with the second cleat body 112 secured by the rivets 120a, 120b to the first cleat body, the assembly can be releasably engaged with the pedal assembly 10. Specifically, the forward and rearward projections 108, 110 of the cleat assembly would be retained by the respective forward and rearward cleat retainers 34, 42 of the pedal assembly. Limited float of the rider's shoe and the second cleat body 112 relative to the first cleat body 106 and the pedal assembly 10 is accommodated by circumferential movement of the rivets 120a, 120b in the kidney-shaped openings 124a, 124b of the second cleat body.

As with the first cleat assembly embodiment 12 depicted in FIGS. 2–6, the second cleat assembly embodiment 104 further includes a stop mechanism for use in controllably adjusting the amount of angular float. Specifically, the first cleat body 106 includes forward and rearward set screws 132a, 132b carried by threaded bores formed in projections 134a, 134b that extend laterally from the first cleat body. The set screws define a pair of first stop surfaces 131. A finger 136 defines a pair of second stop surfaces 133, and projects laterally from the second cleat body 112, between the two set screws. The forward set screw 132a limits clockwise rotation of the first cleat body 106 relative to the second cleat body 112; this corresponds to heel-out rotation of the rider's shoe relative to the pedal assembly 10. The rearward set screw 132b, on the other hand, limits counterclockwise rotation of the first cleat body relative to the second cleat body; this corresponds to heel-in rotation of the rider's shoe relative to the pedal assembly.

Figure 10:
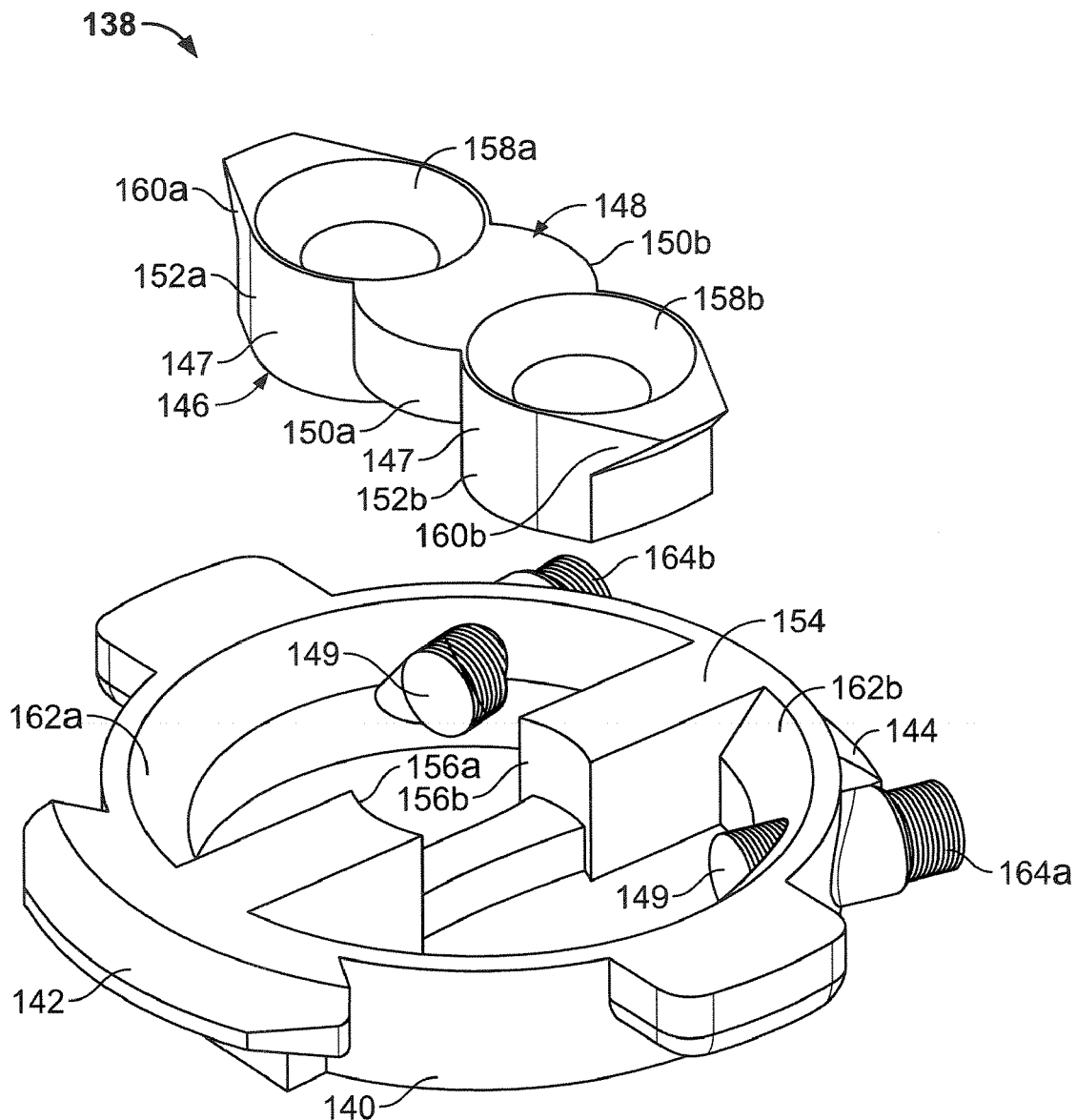
FIG. 10 is an exploded perspective view of the underside of a third embodiment of a cleat assembly in accordance with the invention, including a main cleat body and a rotatable insert.
Figure 11:
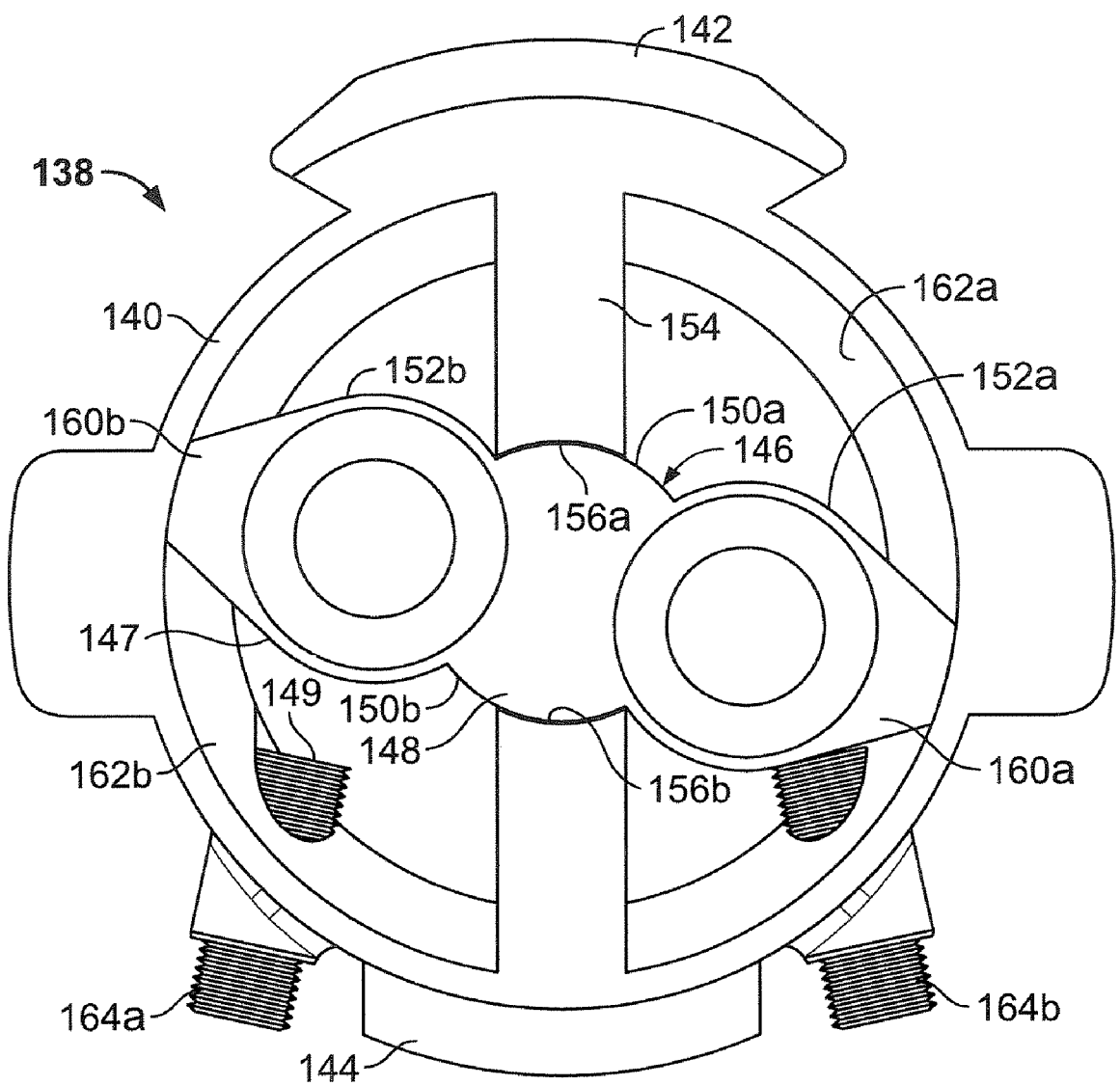
FIG. 11 is a bottom plan view of the cleat assembly of FIG. 10, showing the rotatable insert rotated clockwise to a point where it has engaged one of the two float-adjusting set screws carried by the main cleat body.

FIGS. 10 and 11 depict a third embodiment of a cleat assembly 138 in accordance with the invention, suitable for use with the pedal assembly 10 of FIGS. 1–6. The cleat assembly 138 includes a main cleat body 140 that defines a forward projection 142 and a rearward projection 144, configured for engagement with, and retention by, the respective forward cleat retainer 34 and rearward cleat retainer 42 of the pedal assembly. The main cleat body 140 also defines an open interior configured to receive an elongated insert 146 in an orientation generally transverse to a longitudinal axis defined by the forward and rearward projections. The insert includes three lobes: a central lobe 148 formed in the shape of a disc having two arcuate sidewalls 150a and 150b, and the insert further includes two end lobes 152a, 152b (or second stop surfaces 147) located on opposite sides of the central lobe. The main cleat body 140 includes a rib 154 extending longitudinally across its open interior, for supporting the insert 146. The rib defines arcuate side walls 156a, 156b for conformably receiving the arcuate sidewalls 150a, 150b of the insert's central lobe 148 and thereby allowing limited rotation of the main cleat body relative to the insert.

Countersunk openings 158a, 158b are formed in the respective end lobes 152a, 152b of the insert 146, for use in securing the insert, and thus the cleat assembly 138, to the underside of the sole of a rider's shoe (not shown). The remote ends of the two end lobes include beveled projections 160a, 160b configured to rest on beveled surfaces 162a, 162b of the main cleat body 140. Thus, the insert rotatably engages the main cleat body at its two ends by the beveled surfaces 162a, 162b and at its midpoint by the arcuate sidewalls 156a, 156b of the longitudinal rib 154.

When the insert 146 is secured to the shoe sole, the main cleat body 140 is free to rotate through a limited angle relative to the insert. The amount of rotation is limited by set screws 164a, 164b, which are carried within threaded bores formed in the main cleat body. Each set screw defines a first stop surface 149, and is located so as to engage the insert's end lobe 152a (or second stop surface 147). The set screws are readily adjustable to provide a precise control of float. FIG. 11 depicts the cleat assembly 138 with the main cleat body having been rotated fully clockwise, to bring the end lobe 152a into engagement with the set screw 164b. As in the case of the first cleat assembly embodiment 12, depicted in FIGS. 2–6, further rotation of the main cleat body 140 relative to the insert 146 eventually will release the pedal assembly 10 from the cleat assembly 138.

It should be appreciated from the foregoing description that the present invention provides an improved pedal/cleat assembly having a float range that is easily and precisely adjusted. The pedal/cleat assembly includes a pedal assembly incorporating a forward cleat retainer and a spring-biased rearward cleat retainer, and it further includes a cleat assembly that defines forward and rearward projections sized and configured to engage and be retained by the respective forward and rearward cleat retainers. The cleat assembly includes a first cleat body that defines the forward projection and rearward projections, and it further includes a second cleat body configured to be attached to the underside of a rider's shoe and to be secured to the first cleat body, for limited rotation relative to the first body about a cleat rotation axis. The first cleat body is free to rotate clockwise or counterclockwise relative to the second cleat body by an angular amount that is controlled by a pair of set screws. This provides a pedal float that is easily and precisely adjustable.

It will be appreciated that the invention has been described in detail with reference only to the presently preferred embodiment. Various modifications can be made without departing from the invention. Accordingly, the invention is defined only by the following claims.

I claim:

1. A pedal/cleat assembly comprising:
   a cleat assembly configured for attachment to the underside of a rider's shoe, the cleat assembly including
      a first cleat body defining a forward projection and a rearward projection in a prescribed, fixed relationship to each other,
      a second cleat body configured for attachment to the underside of the rider's shoe and further configured to be secured to the first cleat body for limited rotation relative to the first cleat body about a cleat rotation axis, and a stop mechanism carried by the first and second cleat bodies, for limiting rotation of the second cleat body relative to the first cleat body; and a pedal assembly configured to releasably secure the cleat assembly, wherein the pedal assembly includes
a spindle,
a main pedal body mounted for rotation on the spindle and having an upper side configured for engagement with the cleat assembly, and
forward and rearward cleat retainers projecting upwardly from the upper side of the main pedal body, on opposite sides of the spindle,
wherein the forward and rearward cleat retainers are sized and configured to be forcibly retractable apart from each other, so as to receive and retain the respective forward and rearward projections of the cleat assembly, to secure the cleat assembly to the pedal assembly;

wherein rotation of the second cleat body about the cleat rotation axis, beyond the limit provided by the stop mechanism, when the cleat assembly is secured to the pedal assembly, forcibly retracts the forward and rearward cleat retainers apart from each other, to release the cleat assembly from the pedal assembly.

2. A pedal/cleat assembly as defined in claim 1, wherein:
the stop mechanism comprises
a first stop surface defined on the first cleat body, and
a second stop surface defined on the second cleat body; and
the second cleat body is freely rotatable relative to the first cleat body, about the cleat rotation axis, until the second stop surface engages the first stop surface, whereupon further relative rotation is prevented.

3. A pedal/cleat assembly as defined in claim 2, wherein:
the second stop surface is defined by a finger projecting radially outward from the second cleat body; and
the first stop surface is defined by a set screw adjustably mounted on the first cleat body, wherein adjustment of the set screw modifies the amount by which the second cleat body can be rotated freely relative to the first cleat body.

4. A pedal/cleat assembly as defined in claim 1, wherein:
the stop mechanism comprises
a pair of first stop surfaces defined on the first cleat body, and
a pair of second stop surfaces defined on the second cleat body; and
the second cleat body is freely rotatable relative to the first cleat body, about the cleat rotation axis, until one of the pair of second stop surfaces engages one of the pair of first stop surfaces, whereupon further relative rotation is prevented.

5. A pedal/cleat assembly as defined in claim 4, wherein:
one of the first and second pairs of stop surfaces is defined by two set screws adjustably mounted on the corresponding cleat body; and
adjustment of the set screws modifies the amount of free clockwise and counterclockwise rotation of the second cleat body relative to the first cleat body.

6. A pedal/cleat assembly as defined in claim 4, wherein the other of the first and second pairs of stop surfaces is defined by a finger projecting radially outward from the other of the first and second cleat bodies.

7. A pedal/cleat assembly as defined in claim 6, wherein:
the two set screws are mounted on the first cleat body; and
the finger projects radially outward from the second cleat body.

8. A pedal/cleat assembly as defined in claim 1, wherein:
the first cleat body is unitary and has a circular opening centered on the cleat rotation axis; and
the second cleat body includes a generally disc-shaped section located within the circular opening of the first cleat body.

9. A pedal/cleat assembly as defined in claim 1, wherein:
the pedal assembly further comprises a spring for biasing the forward and rearward cleat retainers toward each other; and
insertion of the cleat assembly into the pedal assembly forcibly retracts the forward and rearward cleat retainers apart from each other, against the yielding bias of the spring, so as to receive and retain the respective forward and rearward projections of the cleat assembly and thereby secure the rider's shoe to the pedal assembly.

10. A pedal/cleat assembly as defined in claim 9, wherein:
the spring comprises a coil section encircling the spindle and an engagement section movable circumferentially relative to the spindle; and
a spring tension adjuster attached to the main pedal body and configured to controllably move the spring's engagement section circumferentially relative to the spindle, to adjust the spring's resistance to movement of the forward and rearward cleat retainers apart from each other.

11. A pedal/cleat assembly as defined in claim 1, wherein:
the main pedal body comprises an inner ring and an outer ring disposed around the spindle, and further comprises a U-shaped member constituting the forward cleat retainer; and
the pedal assembly further comprises
a pivoting latch mechanism mounted on the spindle, between the inner and outer rings of the main pedal body, the pivoting latch mechanism supporting the rearward cleat retainer in a position spaced from the forward cleat retainer, and
a spring operatively connected between the main pedal body and the pivoting latch mechanism, for biasing the rearward cleat retainer toward the forward cleat retainer.

12. A pedal/cleat assembly as defined in claim 11, wherein:
the spring includes first and second coil sections encircling the spindle, on opposite sides of the pivoting latch mechanism, and further includes a U-shaped spring section interconnecting the first and second coil sections; and
a spring tension adjuster engaging the main pedal body and configured to controllably move the spring's U-shaped spring section circumferentially relative to the main pedal body, to adjust the spring's resistance to movement of the forward and rearward cleat retainers apart from each other.

13. A pedal/cleat assembly comprising:
a cleat assembly configured for attachment to the underside of a rider's shoe, the cleat assembly including
a first cleat body defining a forward projection and a rearward projection in a prescribed, fixed relationship to each other, wherein the first cleat body is unitary and has a circular opening centered on a cleat rotation axis,
a second cleat body configured for attachment to the underside of the rider's shoe and further configured to be secured to the first cleat body for limited rotation relative to the first cleat body about the cleat rotation axis, wherein the second cleat body includes a generally disc-shaped section located within the circular opening of the first cleat body, and a stop mechanism carried by the first and second cleat bodies, for limiting rotation of the second cleat body relative to the first cleat body, wherein the stop mechanism includes a first stop surface defined on the first cleat body, and a second stop surface defined on the second cleat body, the second cleat body is freely rotatable relative to the first cleat body, about the cleat rotation axis, until the second stop surface engages the first stop surface, whereupon further relative rotation is prevented;

a pedal assembly configured to releasably secure the cleat assembly, wherein the pedal assembly includes a spindle, a main pedal body mounted for rotation on the spindle and having an upper side configured for engagement with the cleat assembly, forward and rearward cleat retainers projecting upwardly from the upper side of the main pedal body, on opposite sides of the spindle, wherein the forward and rearward cleat retainers are sized and configured to be forcibly retractable apart from each other, so as to receive and retain the respective forward and rearward projections of the cleat assembly, to secure the cleat assembly to the pedal assembly, a spring for biasing the forward and rearward cleat retainers toward each other, wherein the spring comprises a coil section encircling the spindle and an engagement section movable circumferentially relative to the spindle, and a spring tension adjuster attached to the main pedal body and configured to controllably move the spring's engagement section circumferentially relative to the spindle, to adjust the spring's resistance to movement of the forward and rearward cleat retainers apart from each other, wherein insertion of the cleat assembly into the pedal assembly forcibly retracts the forward and rearward cleat retainers apart from each other, against the yielding bias of the spring, so as to receive and retain the respective forward and rearward projections of the cleat assembly and thereby secure the rider's shoe to the pedal assembly;

wherein rotation of the second cleat body about the cleat rotation axis, beyond the limit provided by the stop mechanism, when the cleat assembly is secured to the pedal assembly, forcibly retracts the forward and rearward cleat retainers apart from each other, to release the cleat assembly from the pedal assembly.

\* \* \* \* \*